United States Patent
Nakai

(10) Patent No.: US 12,141,332 B2
(45) Date of Patent: Nov. 12, 2024

(54) INFORMATION PROCESSING DEVICE, INFORMATION PROCESSING METHOD, AND NON-TRANSITORY COMPUTER-READABLE RECORDING MEDIUM

(71) Applicant: Mitsubishi Electric Corporation, Tokyo (JP)

(72) Inventor: Tsunato Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 17/742,101

(22) Filed: May 11, 2022

(65) Prior Publication Data
US 2022/0269826 A1 Aug. 25, 2022

Related U.S. Application Data

(63) Continuation of application No. PCT/JP2020/000196, filed on Jan. 7, 2020.

(51) Int. Cl.
*G06F 21/75* (2013.01)
*G06F 21/64* (2013.01)

(52) U.S. Cl.
CPC .............. *G06F 21/75* (2013.01); *G06F 21/64* (2013.01)

(58) Field of Classification Search
CPC ...... G06F 21/75; G06F 21/64; G06F 21/6209; G06N 20/00
See application file for complete search history.

(56) References Cited

U.S. PATENT DOCUMENTS

| 11,431,488 B1* | 8/2022 | Sapuntzakis | ............ H04L 9/085 |
| 2003/0091191 A1* | 5/2003 | Watanabe | ............. G07F 7/1008 380/277 |

(Continued)

FOREIGN PATENT DOCUMENTS

| CN | 107533812 A | 1/2018 |
| CN | 110537191 A | 12/2019 |

(Continued)

OTHER PUBLICATIONS

"Wikipedia Article: Homomorphic encryption," retrieved from https://de.wikipedia.org/wiki/Homomorphe_Verschl%C3%BCsselung, Aug. 29, 2019, 4 pages total, with English translation.

(Continued)

*Primary Examiner* — Khalid M Almaghayreh
(74) *Attorney, Agent, or Firm* — Birch, Stewart, Kolasch & Birch, LLP

(57) ABSTRACT

A computation procedure change unit (100) changes a computation procedure, each time a computation execution time arrives to execute computation that uses a learning parameter having a value to be adjusted by machine learning, irregularly to a computation procedure which is different from a pre-change computation procedure and with which the same computation result as a computation result obtained by executing computation in accordance with the pre-change computation procedure is obtained. A computation execution unit (101) executes computation that uses the learning parameter, each time the computation execution time arrives, in accordance with the computation procedure that has been changed by the computation procedure change unit (100).

13 Claims, 13 Drawing Sheets

(56) References Cited

U.S. PATENT DOCUMENTS

| | | | |
|---|---|---|---|
| 2007/0180285 | A1 | 8/2007 | Dembo |
| 2010/0281521 | A1* | 11/2010 | Sakakihara ............ H04L 67/104 726/3 |
| 2014/0130173 | A1* | 5/2014 | Kerschbaum ......... G06F 21/125 726/26 |
| 2015/0304102 | A1 | 10/2015 | Nakano et al. |
| 2016/0164674 | A1 | 6/2016 | Nakano et al. |
| 2018/0123780 | A1 | 5/2018 | Ikarashi |
| 2018/0167365 | A1* | 6/2018 | Zarcone ............. H04L 63/0428 |
| 2018/0262331 | A1 | 9/2018 | Noguchi et al. |
| 2019/0156817 | A1* | 5/2019 | Li ......................... G06N 3/044 |
| 2019/0334708 | A1 | 10/2019 | Carpov et al. |
| 2020/0242466 | A1 | 7/2020 | Mohassel et al. |
| 2020/0387797 | A1* | 12/2020 | Ryan ...................... G06N 3/084 |
| 2021/0409191 | A1* | 12/2021 | Williams ................. G06N 3/08 |
| 2023/0118109 | A1 | 4/2023 | Mohassel et al. |

FOREIGN PATENT DOCUMENTS

| | | | |
|---|---|---|---|
| EP | 3 296 981 A1 | 3/2018 | |
| EP | 3 958 158 A1 | 2/2022 | |
| JP | 2007-234001 A | 9/2007 | |
| JP | 2009-288338 A | 12/2009 | |
| JP | 2010-186232 A | 8/2010 | |
| JP | 2010-219603 A | 9/2010 | |
| JP | 2013-77034 A | 4/2013 | |
| JP | 2013-205592 A | 10/2013 | |
| JP | 2016-66860 A | 4/2016 | |
| JP | 2016-178550 A | 10/2016 | |
| JP | 2016-220256 A | 12/2016 | |
| JP | 2017-173702 A | 9/2017 | |
| JP | 2017-207839 A | 11/2017 | |
| JP | 2018-148434 A | 9/2018 | |
| JP | 2019-101807 A | 6/2019 | |
| JP | 2019-109680 A | 7/2019 | |
| JP | 2019-121141 A | 7/2019 | |
| JP | 2019168911 A * | 10/2019 | |
| WO | WO 2018/104686 A1 | 6/2018 | |
| WO | WO 2018/174873 A1 | 9/2018 | |
| WO | WO-2021003450 A1 * | 1/2021 | ............... G06N 3/04 |

OTHER PUBLICATIONS

Batina et al., "CSI NN: Reverse Engineering of Neural Network Architectures Through Electromagentic Side Channel," 28th USENIX Security Symposium, Aug. 14-16, 2019, pp. 515-532 (20 pages total).

Dubey et al., "MaskedNet: The First Hardware Inference Engine Aiming Power Side-Channel Protection," 2020 IEEE International Symposium on Hardware Oriented Security and Trust (HOST), 2019, pp. 197-208.

German Office Action for corresponding German Application No. 112020005424.1, dated Mar. 31, 2023, with English translation.

German Summons to Attend Oral Hearing for German Application No. 11 2020 005 424.1, dated Jun. 7, 2023, with an English translation.

Coron et al., "On Boolean and Arithmetic Masking Against Differential Power Analysis", Cryptographic Hardware and Embedded Systems—CHES 2000, LNCS, vol. 1965, 2000, pp. 231-237.

German Office Action for German Application No. 11 2020 005 424.1, dated Oct. 10, 2023, with an English translation.

Kales "Secret Sharing", Graz University of Technology, 2020, pp. 1-7, http://www.iaik.tugraz.at/wp-content/uploads/teaching/mfc/secret_sharing.pdf.

Batina et al., "CSI Neural Network: Using Side-channels to Recover Your Artificial Neural Network Information", arXiv:1810.09076v1 [cs.CR], Oct. 22, 2018, total 15 pages.

International Search Report for PCT/JP2020/000196 mailed on Mar. 24, 2020.

Nakai et al., "Deep Learning Attacks: Generation of Adversarial Examples using Processing Time Differences", Proceedings of the 2019 Symposium on Cryptography and Information Security (SCIS2019) [USB], Jan. 15, 2019, total 9 pages.

Office Action issued in Japanese Application No. 2020-530398 dated Aug. 25, 2020.

Written Opinion of the International Searching Authority for PCT/JP2020/000196 mailed on Mar. 24, 2020.

Chinese Office Action and Search Report for Chinese Application No. 202080089730.7, dated Jul. 3, 2024, with English translation.

* cited by examiner

Fig. 11

| COMPUTATION | BEFORE CHANGE | AFTER CHANGE |
|---|---|---|
| 1 | $x_0 \times w_0$ | $x_2 \times w_2$ |
| 2 | $x_1 \times w_1$ | $x_0 \times w_0$ |
| 3 | $x_2 \times w_2$ | $x_1 \times w_1$ |

INFORMATION PROCESSING DEVICE, INFORMATION PROCESSING METHOD, AND NON-TRANSITORY COMPUTER-READABLE RECORDING MEDIUM

CROSS REFERENCE TO RELATED APPLICATION

This application is a Continuation of PCT International Application No. PCT/JP2020/000196, filed on Jan. 7, 2020, which is hereby expressly incorporated by reference into the present application.

TECHNICAL FIELD

The present invention relates to an information processing device, an information processing method, and an information processing program.

BACKGROUND ART

In recent years, with the spread of the Internet, a wide variety of services using the Internet have been provided. As one of these services, services using machine learning represented by deep learning are increasing, such as financial services, search engine services, and pattern recognition services.

Meanwhile, many security incidents such as information leakage of confidential information due to cyber attacks have been reported. In order to prevent leakage of information assets due to the security incidents, security measures against cyber attacks such as data encryption are taken increasingly.

In a service using machine learning, learning model information such as a model architecture that constitutes a learning model of machine learning, and a learning parameter whose value is adjusted by learning, is important information that determines the quality of the service, and is regarded as one information asset having an industrial value. Existence of a cyber attack aimed at stealing the learning model information has been pointed out. In view of this, studies have been made on security measures to protect the learning model information from the cyber attack.

For example, Patent Literature 1 discloses a method of protecting learning model information from a cyber attack by storing learning model information in a secure element having tamper resistance, and further by scrambling the learning model information and storing the scrambled learning model information.

CITATION LIST

Patent Literature

Patent Literature 1: JP 2019-101807 A

SUMMARY OF INVENTION

Technical Problem

According to the technique of Patent Literature 1, the learning model information is scrambled and stored in the secure element. When executing computation, the learning model information is descrambled by a processor, is read out, and is used for the computation.

This poses a problem that the learning model information cannot be protected from the Model Reverse-Engineering attack technique that imitates the learning model by analyzing the learning model information from side channel information such as power consumption and leakage electromagnetic waves generated during calculation execution.

A major objective of the present disclosure is to solve the above problem. Specifically, the major objective of the present disclosure is to protect a learning parameter, which is learning model information, from the Model Reverse-Engineering attack technique.

Solution to Problem

An information processing device according to the present disclosure has:

a computation procedure change unit to change a computation procedure, each time a computation execution time arrives to execute computation that uses a learning parameter having a value to be adjusted by machine learning, irregularly to a computation procedure which is different from a pre-change computation procedure and with which a same computation result as a computation result obtained by executing computation in accordance with the pre-change computation procedure is obtained; and a computation execution unit to execute computation that uses the learning parameter, each time the computation execution time arrives, in accordance with the computation procedure that has been changed by the computation procedure change unit.

Advantageous Effects of Invention

According to the present disclosure, a learning parameter can be protected from the Model Reverse-Engineering attack technique.

BRIEF DESCRIPTION OF DRAWINGS

FIG. 11 is a diagram illustrating a change of a computation procedure according to Embodiment 2.

DESCRIPTION OF EMBODIMENTS

Embodiments of the present disclosure will be described with referring to drawings. In explanation and drawings of the following embodiments, the same reference sign denotes the same or equivalent portion.

In the following embodiments, explanation will be made with referring to a technique that uses a neural network, as an example of a machine learning technique that forms a basis of a learning model.

Embodiment 1

DESCRIPTION OF CONFIGURATION

Figure 1:
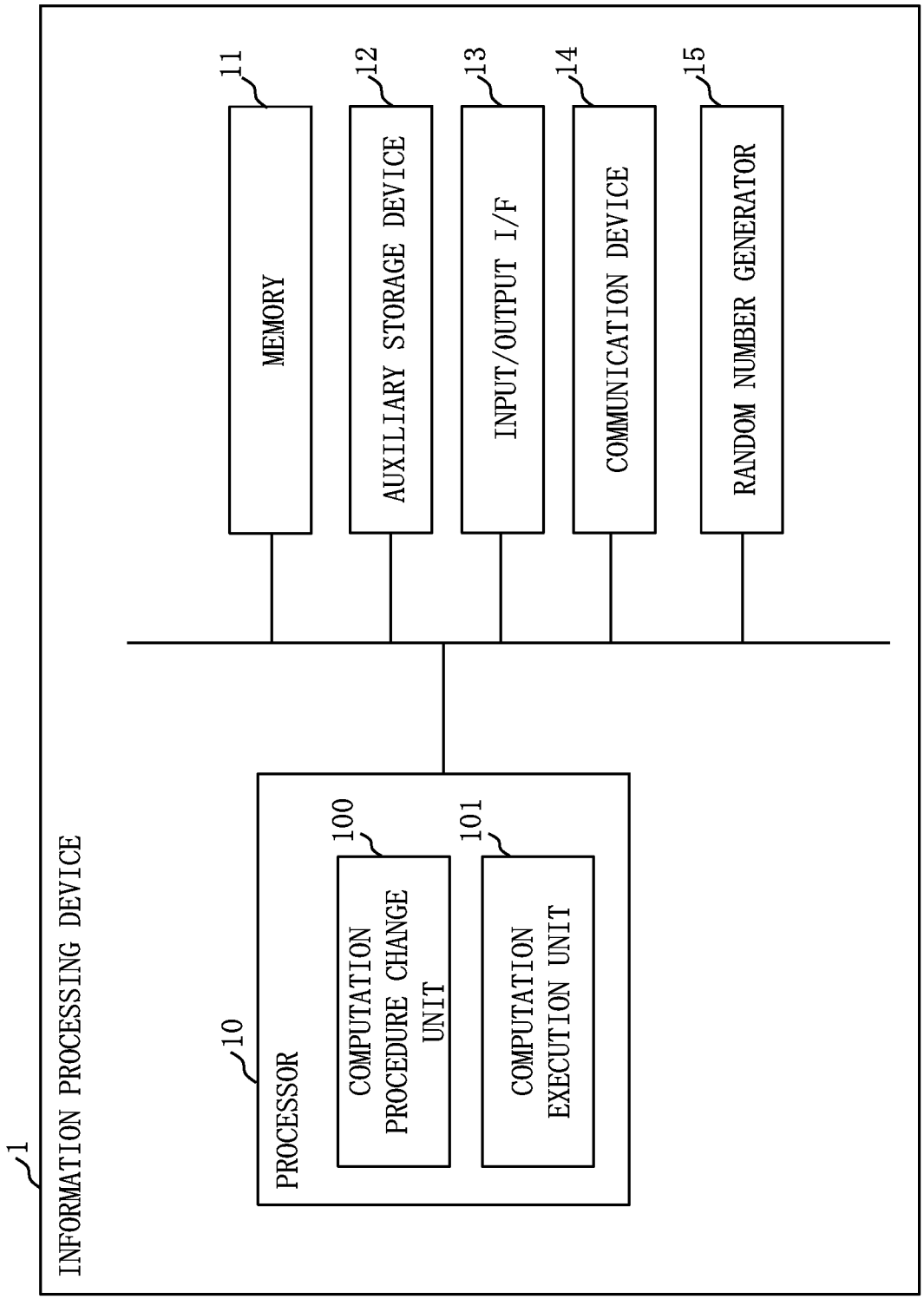
FIG. 1 is a diagram illustrating a configuration example of hardware of an information processing device according to Embodiment 1.

FIG. 1 illustrates a hardware configuration example of an information processing device 1 according to the present embodiment.

The information processing device 1 is a computer.

The information processing device 1 is an information processing device that performs a learning process and an inference process with using a learning model 110 to be described later.

The learning process is a process that provides supervisor data in, for example, supervised learning, and adjusts a learning parameter 220 to be described later. The inference process is a process that performs prediction, discrimination, and so on about unknown data on the basis of the learning parameter 220 adjusted by the learning process.

The information processing device 1 is provided with a processor 10, a memory 11, an auxiliary storage device 12, an input/output I/F 13, a communication device 14, and a random number generator 15 which are connected to each other via a signal line.

An operation procedure of the information processing device 1 corresponds to an information processing method. A program that implements operations of the information processing device 1 corresponds to an information processing program.

The processor 10 is an Integrated Circuit (IC) which performs processing. Specific examples of the processor 10 are a Central Processing Unit (CPU), a Digital Signal Processor (DSP), and so on.

The memory 11 is a storage device which stores data temporarily. A specific example of the memory 11 is a Random-Access Memory (RAM).

The auxiliary storage device 12 is an auxiliary storage device for keeping a program that implements a function of a computation procedure change unit 100 (to be described later) and a function of a computation execution unit 101 (to be described later). A specific example of the auxiliary storage device 12 is a hard disk.

The auxiliary storage device 12 may be a portable recording medium such as a Solid-State Drive (SSD, registered trademark), a Secure Digital (SD, registered trademark) memory card, a CompactFlash (CF, registered trademark), a NAND flash, a flexible disk, an optical disk, a compact disk, a Blu-ray (registered trademark) Disc, and a Digital Versatile Disk (DVD, registered trademark).

The program stored in the auxiliary storage device 12 to implement the functions of the computation procedure change unit 100 and computation execution unit 101 is loaded by the memory 11. This program is read out and run by the processor 10.

An Operating System (OS) is also stored in the auxiliary storage device 12.

At least part of the OS is run by the processor 10.

The processor 10 runs the program that implements the functions of the computation procedure change unit 100 and computation execution unit 101 while running at least part of the OS.

By the processor 10 running the OS, task management, memory management, file management, communication control, and so on are performed.

At least one of information, data, signal values, and variable values indicating processing results of the computation procedure change unit 100 and computation execution unit 101 is stored in at least one of the processor 10, the memory 11, a register in the auxiliary storage device 12, and a cache memory in the auxiliary storage device 12.

The program that implements the functions of the computation procedure change unit 100 and computation execution unit 101 may be stored in a portable recording medium such as a hard disk, an SSD (registered trademark), an SD (registered trademark) memory card, a CF (registered trademark), a NAND flash, a flexible disk, an optical disk, a compact disk, a Blu-ray (registered trademark) Disc, and a DVD (registered trademark).

Then, the program that implements the functions of the computation procedure change unit 100 and computation execution unit 101 may be circulated.

The communication device 14 is an electronic circuit that executes a data communication process with a connected party. A specific example of the communication device 14 is a communication chip for Ethernet (registered trademark) or a Network Interface Card (NIC).

The random number generator 15 is an electronic circuit that generates random numbers. Alternatively, the random number generator 15 may be a program implemented by the processor 10.

Figure 2:
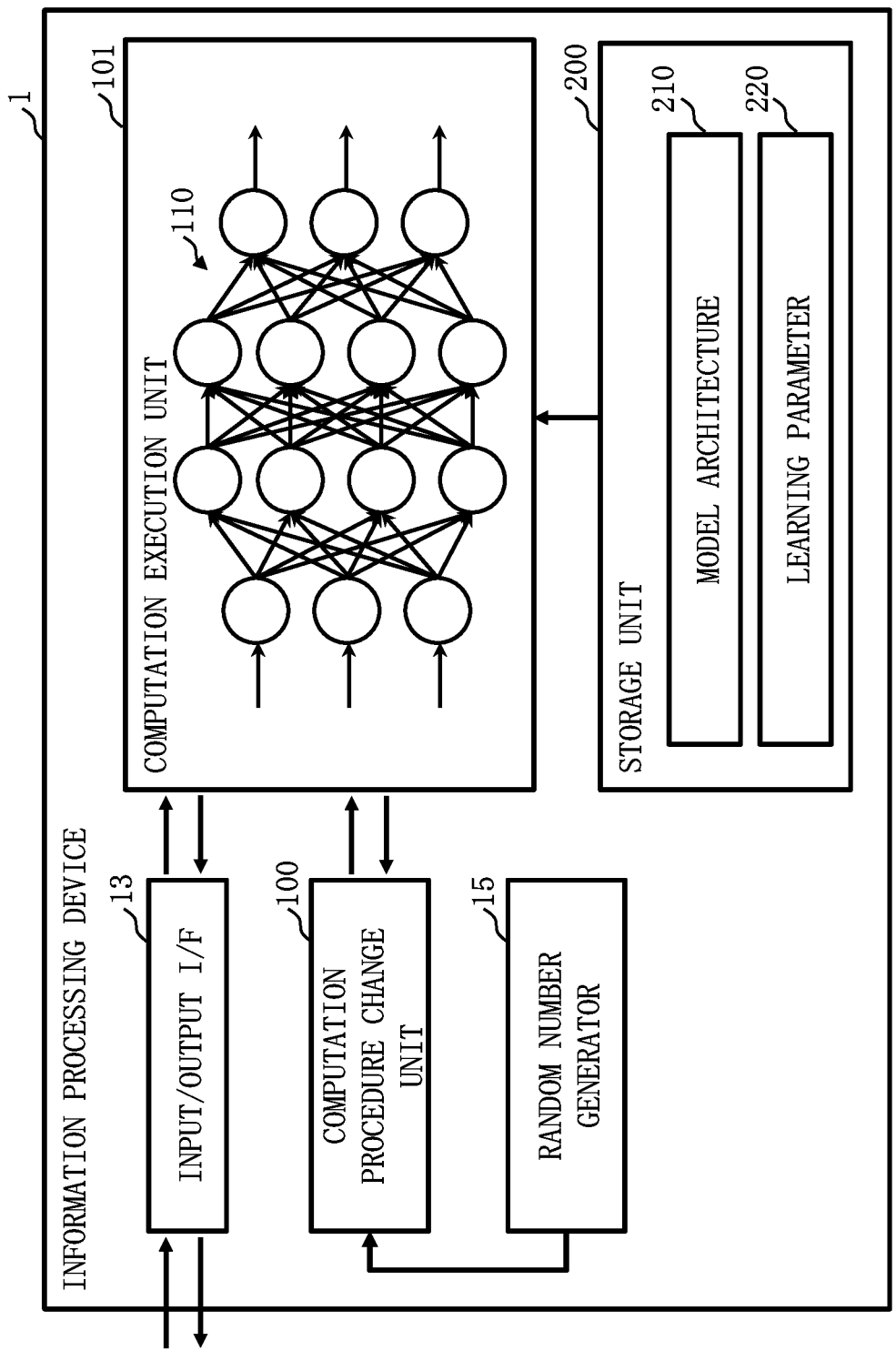
FIG. 2 is a diagram illustrating a function configuration example of the information processing device according to Embodiment 1.

FIG. 2 is a diagram illustrating a function configuration example of the information processing device 1 according to the present embodiment.

The information processing device 1 is provided with the computation procedure change unit 100, the computation execution unit 101, and a storage unit 200.

The computation procedure change unit 100 changes a computation procedure that uses the learning parameter 220 to be described later.

Specifically, the computation procedure change unit 100 changes the computation procedure irregularly each time a computation execution time arrives to execute computation that uses the learning parameter 220. The computation procedure change unit 100 changes the computation procedure to a computation procedure which is different from a pre-change computation procedure and with which the same computation result as a computation result obtained by executing computation in accordance with the pre-change computation procedure is obtained.

A process performed by the computation procedure change unit 100 corresponds to a computation procedure change process.

The computation execution unit 101 executes the computation on the basis of the computation procedure set down by the learning model 110 and changed by the computation procedure change unit 100.

Specifically, the computation execution unit 101 executes computation that uses the learning parameter 220, each time the computation execution time arrives, in accordance with a computation procedure changed by the computation procedure change unit 100.

A process performed by the computation execution unit 101 corresponds to a computation execution process.

The learning model 110 is a model that sets down a computation procedure based on machine learning. The learning model 110 is decided by learning model information to be described later.

In the present embodiment, the learning model 110 is a neural network.

The storage unit 200 is a storage area where the learning model information to be used in the learning process and the inference process of the information processing device 1 is stored. The learning model information specifically consists of the model architecture 210 and the learning parameter 220.

The model architecture 210 is specifically a parameter in the neural network, such as a number of units, a number of layers, and an activation function, which is not adjusted by the learning process.

In FIG. 2, a circle in the learning model 110 represents a unit. An array of circles represents a layer. Hence, the number of units and the number of layers in the model architecture 210 are 14 and 4, respectively.

The learning parameter 220 is specifically a parameter in the neural network, such as a weight and a bias, whose value is adjusted by the learning process.

The storage unit 200 is implemented by the memory 11 and the auxiliary storage device 12.

The model architecture 210 and the learning parameter 220 may be stored in a portable recording medium such as a hard disk, an SSD (registered trademark), an SD (registered trademark) memory card, a CF (registered trademark), a NAND flash, a flexible disk, an optical disk, a compact disk, a Blu-ray (registered trademark) Disc, and a DVD (registered trademark).

Alternatively, the model architecture 210 and the learning parameter 220 may be stored in a device connected to the learning parameter 220 via the communication device 14.

The term "unit" in each of the computation procedure change unit 100, the computation execution unit 101, and the storage unit 200 may be replaced by "circuit", "stage", "procedure", or "process".

The information processing device 1 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the computation procedure change unit 100, the computation execution unit 101, and the storage unit 200 is implemented as part of the processing circuit.

In the present specification, a broader term of the processor and processing circuit is "processing circuitry".

That is, each of the processor and the processing circuit is a specific example of "processing circuitry".

DESCRIPTION OF OPERATIONS

Figure 3:
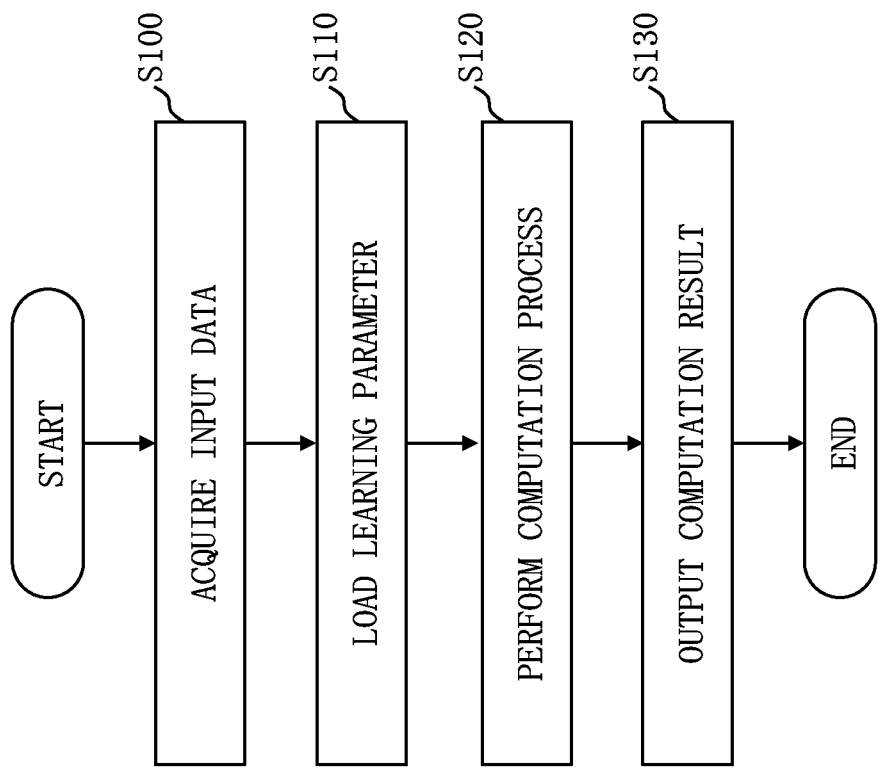
FIG. 3 is a flowchart illustrating an operation example of the information processing device according to Embodiment 1.

An operation example of the information processing device 1 according to the present embodiment will be described with referring to the flowchart of FIG. 3.

In the present embodiment, explanation will be made with using the inference process as an example of a process of machine learning.

First, in step S100, the computation execution unit 101 acquires input data via the input/output I/F 13.

Subsequently, in step S110, the computation execution unit 101 loads the model architecture 210 and the learning parameter 220 which are the learning model information stored in the storage unit 200.

Subsequently, in step S120, the computation execution unit 101 executes computation in accordance with the computation procedure set down by the learning model 110 on the basis of the loaded learning model information and changed by the computation procedure change unit 100. The time at which the computation procedure change unit 100 executes the computation is a computation execution time. Details of the computation process will be described later.

Then, in step S130, the computation execution unit 101 outputs a computation result via the input/output I/F 13.

Figure 4:
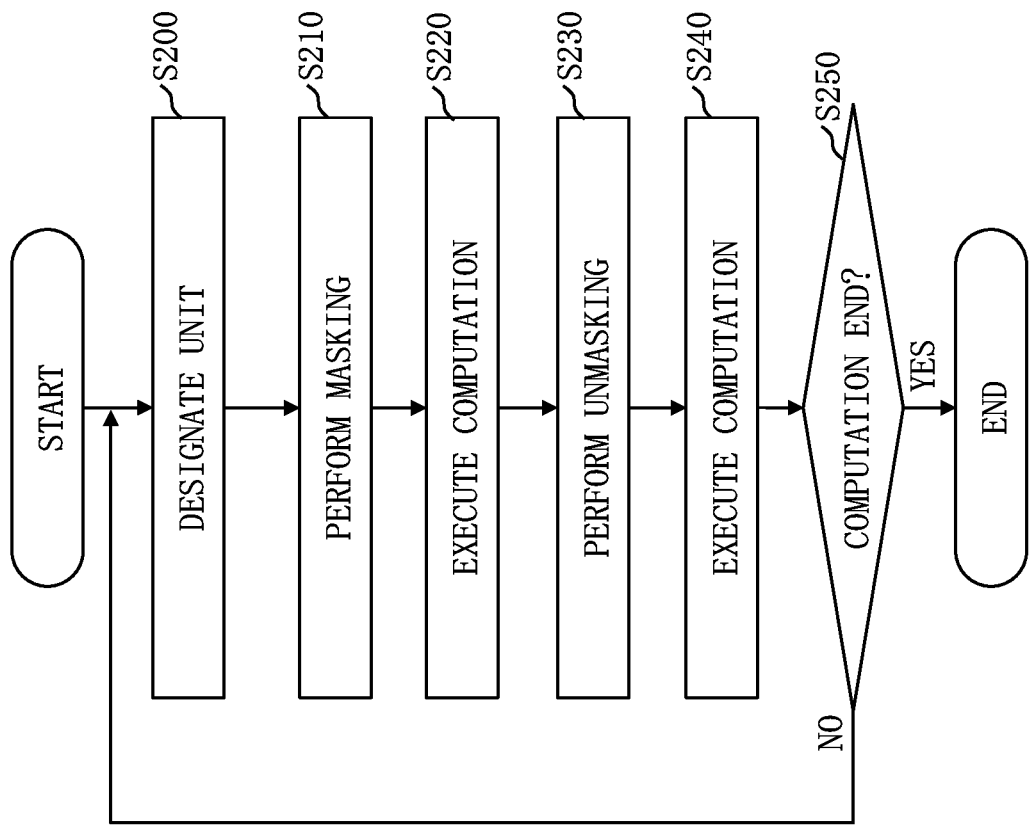
FIG. 4 is a flowchart illustrating a computation process of the information processing device according to Embodiment 1.

FIG. 4 is a flowchart illustrating a computation process example of the information processing device 1 according to the present embodiment.

In the present embodiment, the value of the learning parameter 220 is a weight, set down by the learning model 110, in each unit. An operand value to be computed with the value of the learning parameter 220 is an input value, set down by the learning model 110, in each unit.

First, in step S200, the computation execution unit 101 designates one unit, set down by the learning model 110, in the neural network.

Specifically, the computation execution unit 101 designates a non-designated unit of second-layer units sequentially. If the computation execution unit 101 has designated all units in one layer, it designates a unit of a next layer. In a specific example, if the computation execution unit 101 has designated all units in the second layer, it designates a unit in a third layer.

Subsequently, in step S210, the computation procedure change unit 100 performs masking.

Specifically, the computation execution unit 101 notifies the computation procedure change unit 100 of a plurality of values and a plurality of weights which are to be inputted to the designated unit.

Upon reception of the notification from the computation execution unit 101, the computation procedure change unit 100 acquires a random number from the random number generator 15. Then, using the random number acquired from the random number generator 15, the computation procedure change unit 100 masks the values notified of by the computation execution unit 101. Details of masking will be described later.

Furthermore, on the basis of the random number acquired from the random number generator 15 and the values notified of by the computation execution unit 101, the computation procedure change unit 100 calculates a value to be used for unmasking, and stores that value.

Unmasking is a process by which a result of computation performed using masked values becomes the same as a result of computation performed without masking.

Then, the computation procedure change unit 100 notifies the computation execution unit 101 of the masked values.

Subsequently, in step S220, the computation execution unit 101 executes computation using the masked values notified of by the computation procedure change unit 100. Details of computation after masking will be described later.

Then, the computation execution unit 101 notifies the computation procedure change unit 100 of a computation result.

Subsequently, in step S230, the computation procedure change unit 100 performs unmasking on the computation result notified of by the computation execution unit 101. Details of unmasking will be described later.

A computation result obtained by this unmasking is the same as the computation result obtained using the pre-masking weights and the pre-masking input values.

Then, the computation procedure change unit 100 notifies the computation execution unit 101 of the computation result obtained by this unmasking.

Subsequently, in step S240, the computation execution unit 101 executes bias addition and computation of the activation function sequentially on the computation result notified of by the computation procedure change unit 100.

An execution result of computing the activation function is a value that is to be inputted to a lower-layer unit. If there is no lower-layer unit, the execution result of computing the activation function is a computation result that is to be outputted.

The computation procedure change unit 100 changes the computation procedure by: masking the input values inputted to the unit; causing the computation execution unit 101 to perform computation using the masked values; unmasking the computation result of the computation execution unit 101; and causing the computation execution unit 101 to perform bias addition using the unmasked values, and computation of the activation function. The computation result (computation result of the activation function) before changing the computation procedure is the same as the computation result (computation result of the activation function) after changing the computation procedure.

In this manner, the computation procedure change unit 100 changes the computation procedure while keeping the sameness of the computation results of the computations that use the activation function. Then, the computation execution unit 101 performs computation in accordance with the post-change computation procedure. Specifically, the computation execution unit 101 performs computation on the values masked by the computation procedure change unit 100, instead of performing computation on the input values inputted to the unit. Also, the computation execution unit 101 outputs a computation result of the masked values to the computation procedure change unit 100 and executes bias addition and computation of the activation function on the values unmasked by the computation procedure change unit 100, instead of executing computation of the activation function on a computation result of the input values inputted to the unit.

Subsequently, in step S250, the computation execution unit 101 judges whether the computation has ended or not.

Specifically, the computation execution unit 101 confirms whether or not all units excluding the first-layer units which are set down by the learning model 110 have been designated.

Then, if the computation execution unit 101 confirms that all units excluding the first-layer units which are set down by the learning model 110 have been designated, the computation process ends.

On the other hand, if the computation execution unit 101 confirms that an undesignated unit exists among the units excluding the first-layer units which are set down by the learning model 110, the process returns to step S200.

Examples of masking, computation after masking, and unmasking will now be described with referring to FIGS. 5 and 6.

Figure 5:
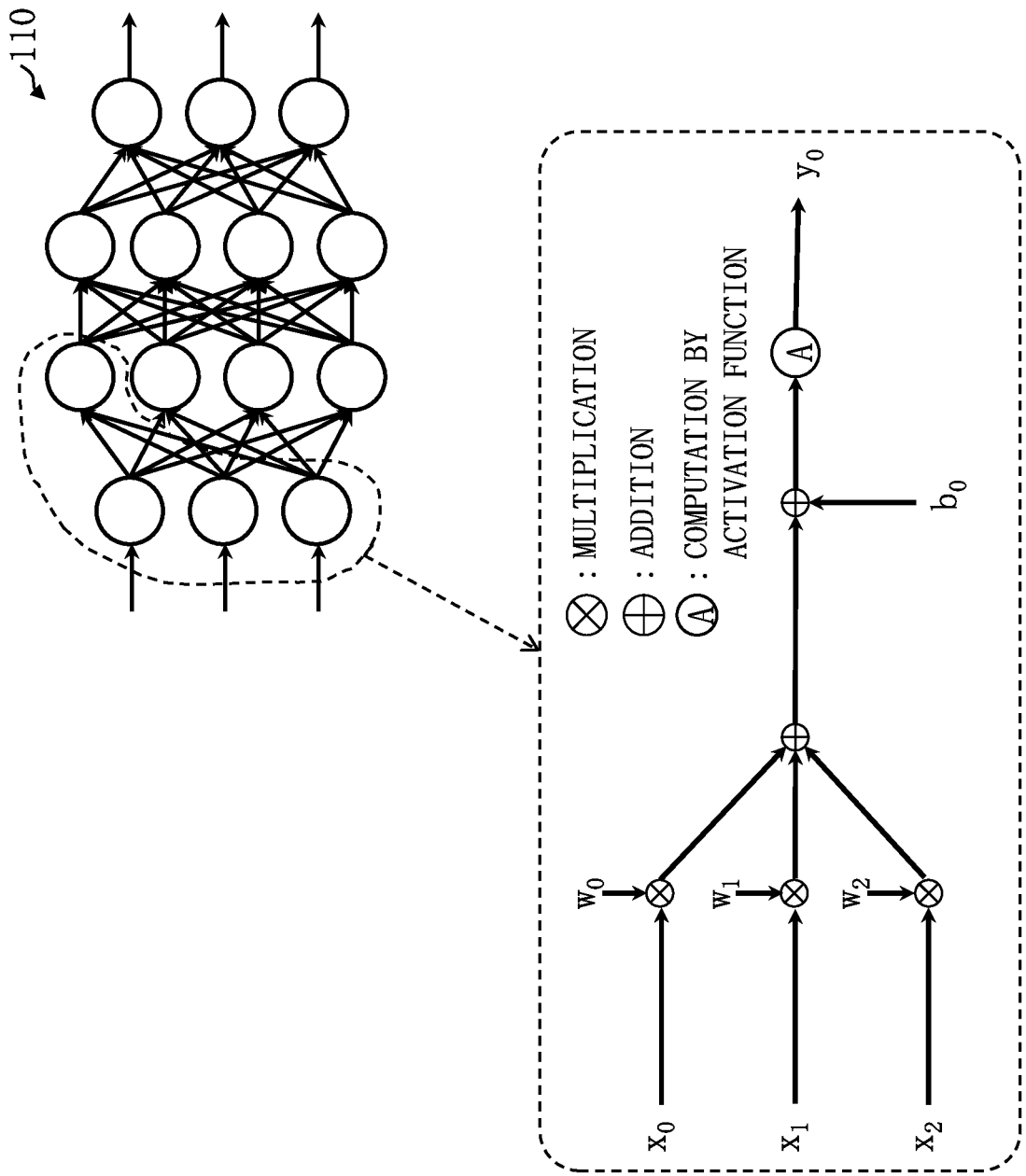
FIG. 5 is a diagram illustrating a computation procedure of a unit of a learning model according to Embodiment 1.

FIG. 5 illustrates an example of a computation procedure of one unit of the learning model 110.

The input values are $x_0$, $x_1$, and $x_2$. The weights are $w_0$, $w_1$, and $w_2$.

The input values $x_0$, $x_1$, and $x_2$, and the weights $w_0$, $w_1$, and $w_2$ are multiplied between values of the same subscript as a combination. Then, a total sum of the individual products is calculated. The total sum is $x_0w_0+x_1w_1+x_2w_2$.

After that, a bias $b_0$ is added to the total sum. A value after addition of the bias $b_0$ is subjected to computation by the activation function, and a computation result is outputted as an output $y_0$.

Figure 6:
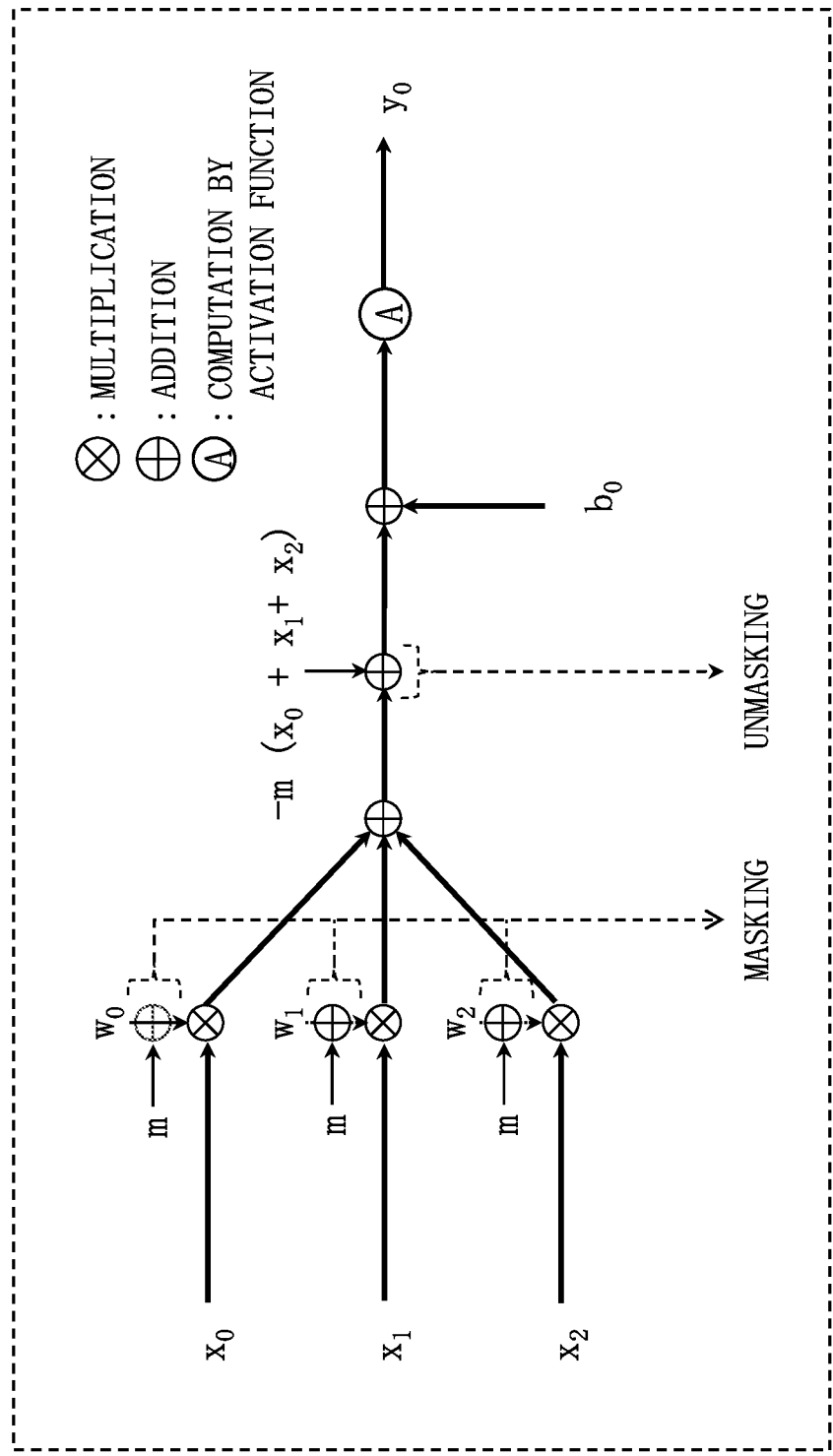
FIG. 6 is a diagram illustrating a change of the computation procedure according to Embodiment 1.

FIG. 6 illustrates an example of a computation procedure that has been changed from the computation procedure of FIG. 5 by performing a masking process through addition, and an unmasking process.

The weights $w_0$, $w_1$, and $w_2$ are first added each with a random number m so that they are masked. In this manner, masking is a process of concealing at least either one of the value of the learning parameter 220 and the operand value, by adding the same to, or multiplying the same by, a random number generated by the random number generator 15.

After that, the input values $x_0$, $x_1$, and $x_2$, and the masked weights $w_0+m$, $w_1+m$, and $w_2+m$ are multiplied between values of the same subscript as a combination. Then, a total sum of individual products is calculated. The total sum is $x_0w_0+x_1w_1+x_2w_2+m(x_0+x_1+x_2)$.

The total sum is added to a value $-m(x_0+x_1+x_2)$ which has been calculated and stored by the computation procedure change unit 100 to be used for unmasking, so that the total sum is unmasked. Because of this unmasking, a computation result obtained before adding the bias $b_0$ is $x_0w_0+x_1w_1+x_2w_2$, which is the same as the computation result obtained before addition of the bias $b_0$ in a case where masking is not performed.

In the case of masking by addition, unmasking may be performed after the bias $b_0$ is added.

DESCRIPTION OF EFFECT OF EMBODIMENT

As described above, in the present embodiment, a masking process using a random number and an unmasking process are added to the computation procedure which is set down by the learning model. Hence, each time computation is to be executed, the computation procedure is changed irregularly. Accordingly, side channel information generated when the computation is executed changes irregularly. Therefore, it is possible to prevent the learning parameter being the learning model from being analyzed.

The present embodiment has been described by using, as an example of the machine learning technique which is a basis of the learning model, a technique that uses a neural network. However, the learning model is not limited to this. A learning model may be based on a technique such as deep learning, the regression method, decision tree learning, the Bayesian method, and clustering.

The machine learning process may be applied not only to the inference process but also to the learning process.

Other Configurations

<Modification 1>

In Embodiment 1, masking is performed by adding a random number to a weight which is a value of the learning parameter 220. Alternatively, masking may be performed by multiplying the weight by a random number. This Modification 1 will be described regarding its difference from Embodiment 1.

Figure 7:
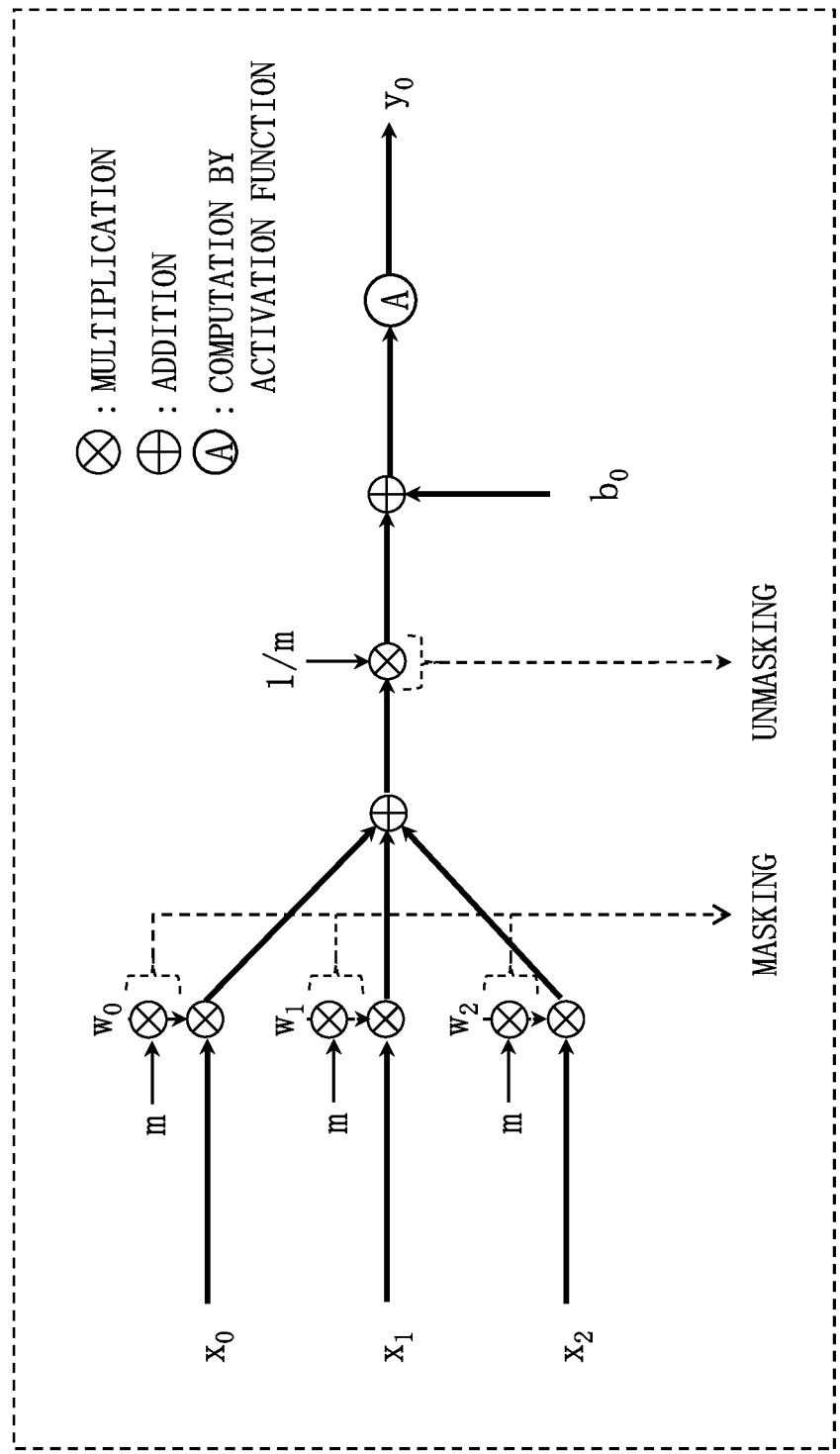
FIG. 7 is a diagram illustrating a change of a computation procedure according to Modification 1 of Embodiment 1.

FIG. 7 illustrates an example of a computation procedure that has been changed from the computation procedure of FIG. 5 by performing a masking process through multiplication of the weights, and an unmasking process.

The weights $w_0$, $w_1$, and $w_2$ are first multiplied each by a random number m so that they are masked.

After that, the input values $x_0$, $x_1$, and $x_2$, and masked weights $mw_0$, $mw_1$, and $mw_2$ are multiplied between values of the same subscript as a combination. Then, a total sum of individual products is calculated. The total sum is $mx_0w_0+mx_1w_1+mx_2w_2$.

The total sum is multiplied by a value 1/m which has been calculated and stored by a computation procedure change unit 100 to be used for unmasking, so that the total sum is unmasked. Because of this unmasking, a computation result obtained before adding the bias $b_0$ is $x_0w_0+x_1w_1+x_2w_2$, which is the same as the computation result obtained before adding the bias $b_0$ in a case where masking is not performed.

<Modification 2>

In Modification 2, masking may be performed by adding a random number to input values which are operand values.

Figure 8:
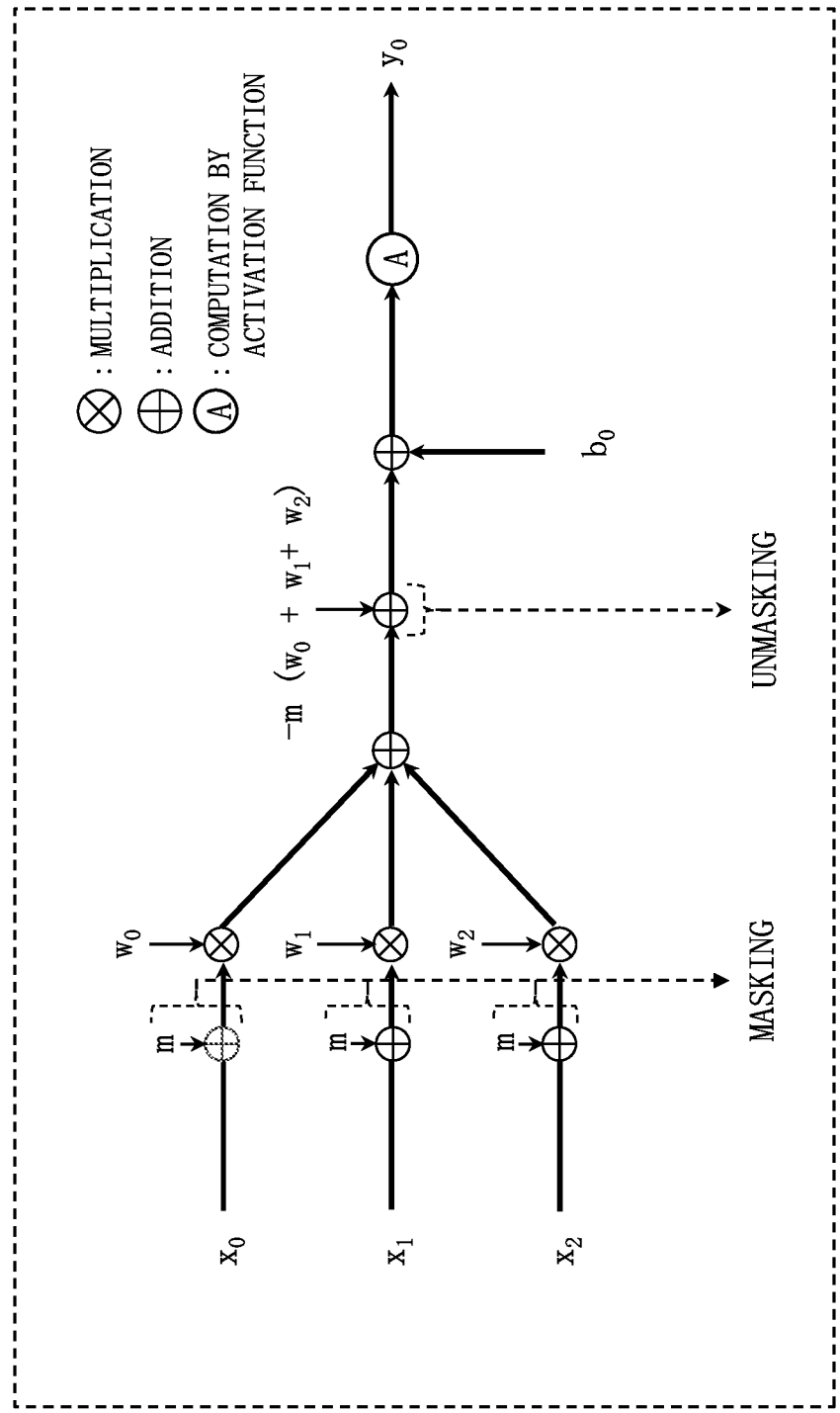
FIG. 8 is a diagram illustrating a change of a computation procedure according to Modification 2 of Embodiment 1.

FIG. 8 illustrates an example of a computation procedure that has been changed from the computation procedure of FIG. 5 by performing a masking process through addition to the input values, and an unmasking process.

The input values $x_0$, $x_1$, and $x_2$ are first added each with the random number m so that they are masked.

After that, the masked input values $x_0+m$, $x_1+m$, and $x_2+m$, and the weights $w_0$, $w_1$, and $w_2$ are multiplied between values of the same subscript as a combination. Then, a total sum of individual products is calculated. The total sum is $x_0w_0+x_1w_1+x_2w_2+m(w_0+w_1+w_2)$.

The total sum is added to a value $-m(x_0+x_1+x_2)$ which has been calculated and stored by a computation procedure change unit 100 to be used for unmasking, so that the total sum is unmasked. Because of this unmasking, a computation result obtained before adding the bias $b_0$ is $x_0w_0+x_1w_1+x_2w_2$, which is the same as the computation result obtained before adding the bias $b_0$ in a case where masking is not performed.

In a case of masking by addition, unmasking may be performed after the bias $b_0$ is added.

<Modification 3>

In Modification 3, masking may be performed by multiplying input values which are operand values, by a random number.

Figure 9:
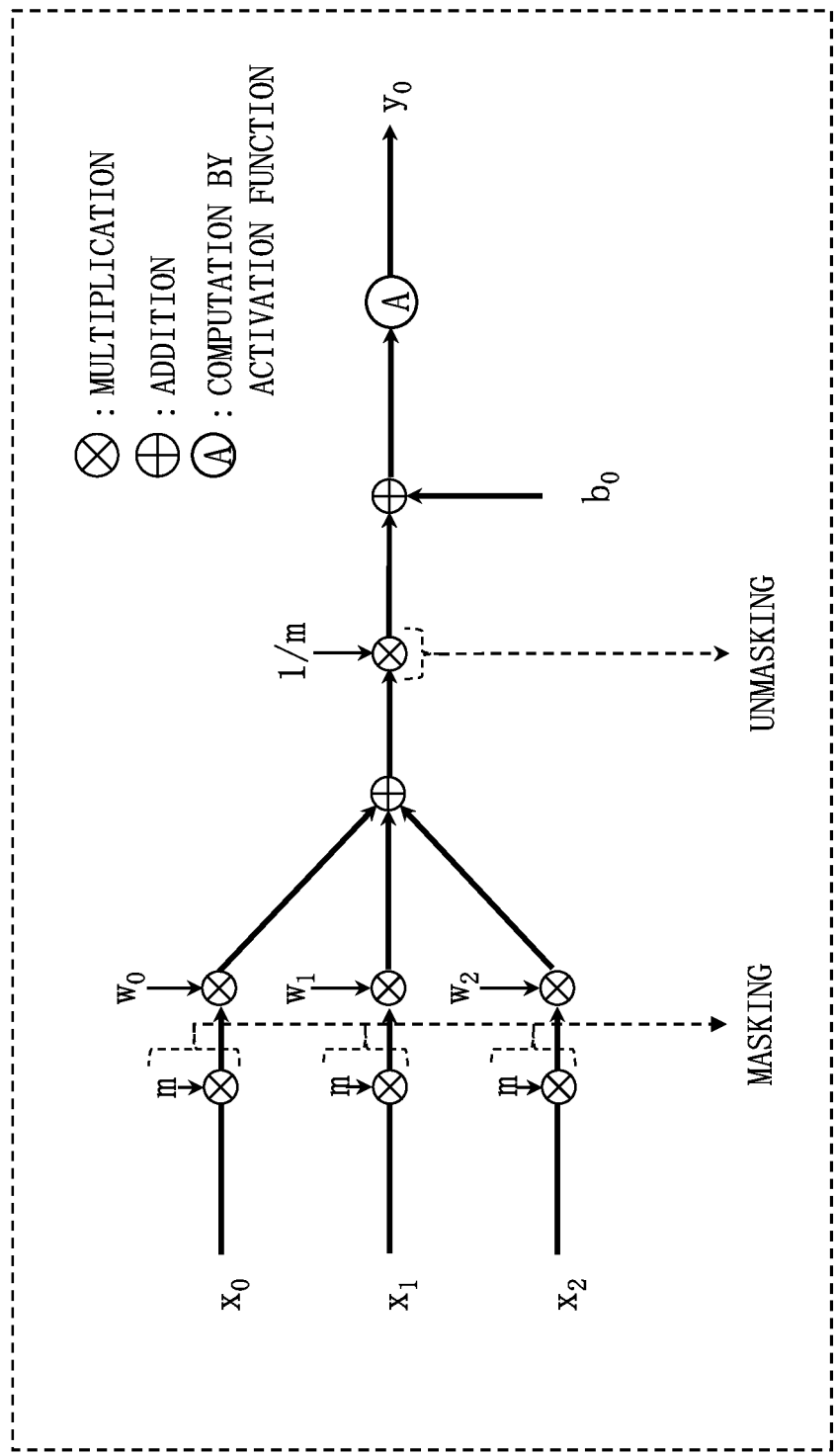
FIG. 9 is a diagram illustrating a change of a computation procedure according to Modification 3 of Embodiment 1.

FIG. 9 illustrates an example of a computation procedure that has been changed from the computation procedure of FIG. 5 by performing a masking process through multiplication of the input values, and an unmasking process.

The input values $x_0$, $x_1$, and $x_2$ are first multiplied each by the random number m so that they are masked.

After that, the masked input values $mx_0$, $mx_1$, and $mx_2$, and the weights $w_0$, $w_1$, and $w_2$ are multiplied between values of the same subscript as a combination. Then, a total sum of individual products is calculated. The total sum is $mx_0w_0+mx_1w_1+mx_2w_2$.

The total sum is multiplied by a value 1/m which has been calculated and stored by a computation procedure change unit 100 to be used for unmasking, so that the total sum is unmasked. Because of this unmasking, a computation result obtained before adding the bias $b_0$ is $x_0w_0+x_1w_1+x_2w_2$, which is the same as the computation result obtained before adding the bias $b_0$ in a case where masking is not performed.

Embodiment 2

With a configuration of the present embodiment, an example of a process of changing a computation order will be described.

The present embodiment mainly describes a difference from Embodiment 1.

Matters that are not described below are the same as in Embodiment 1.

Figure 10:
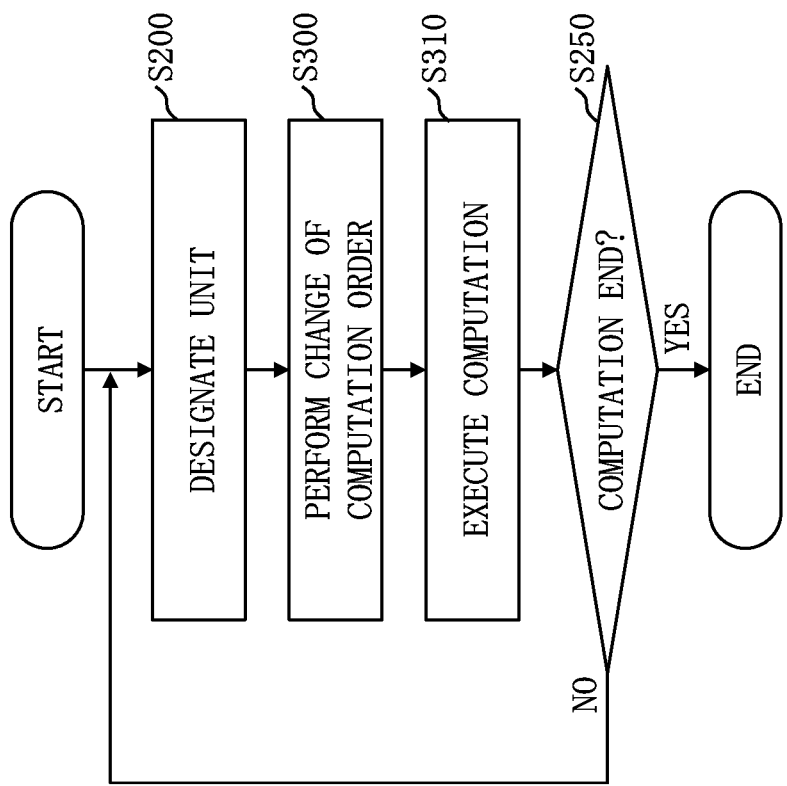
FIG. 10 is a flowchart illustrating a computation process of an information processing device according to Embodiment 2.

FIG. 10 is a flowchart illustrating a computation process example of an information processing device 1 according to the present embodiment. The same operation as in Embodiment 1 is denoted by the same reference sign as in Embodiment 1, and will not be described.

After step S200 is completed, in step S300, a computation procedure change unit 100 changes a computation order.

Specifically, a computation execution unit 101 notifies the computation procedure change unit 100 of a computation order of computation that uses a plurality of input values and a plurality of weights inputted to a designated unit.

Subsequently, the computation procedure change unit 100 acquires a random number from a random number generator 15 and decides a post-change computation order. In a specific example, the computation procedure change unit 100 decides the computation order with using the Fisher-Yates shuffle. A shuffle algorithm used for deciding the post-change computation order is not limited to the Fisher-Yates shuffle. Another shuffle algorithm such as Sattolo's algorithm may be used.

Then, the computation procedure change unit 100 notifies the computation execution unit 101 of the decided post-change computation order.

Subsequently, in step S310, the computation execution unit 101 executes computation on the basis of the post-change computation order notified of by the computation procedure change unit 100.

After that, the computation execution unit 101 executes bias addition and computation of the activation function sequentially.

An example of a change of the computation procedure according to the present embodiment will be described with referring to FIG. 11.

In FIG. 11, a computation order is indicated in left-end fields. FIG. 11 also indicates a pre-change order and a post-change order.

FIG. 11 indicates that the pre-change order is in the order of computation 1: $x_0 \times w_0$, computation 2: $x_1 \times w_1$, and computation 3: $x_2 \times w_2$.

FIG. 11 also indicates that the post-change computation order is in the order of computation 1: $x_2 \times w_2$, computation 2: $x_0 \times w_0$, and computation 3: $x_1 \times w_1$.

As has been described above, in the present embodiment, a process of changing the computation procedure using a random number is added to the computation procedure which is set down by the learning model. Hence, each time computation is to be executed, the computation procedure is changed irregularly. Accordingly, the side channel information generated when the computation is executed changes irregularly. Therefore, it is possible to prevent the learning parameter being the learning model information from being analyzed.

Embodiment 3

The present embodiment describes a case of performing a secret sharing process which conceals a value of a learning parameter 220 and an operand value to be computed with the learning parameter 220 on the basis of Shamir's secret sharing scheme.

In the present embodiment, the value of the learning parameter 220 is a weight, which is set down by a learning model 110, in each unit. The operand value to be computed with the value of the learning parameter 220 is an input value, which is set down by the learning model 110, in each unit.

The present embodiment mainly describes a difference from Embodiment 2.

Matters that are not described below are the same as in Embodiment 2.

Figure 12:
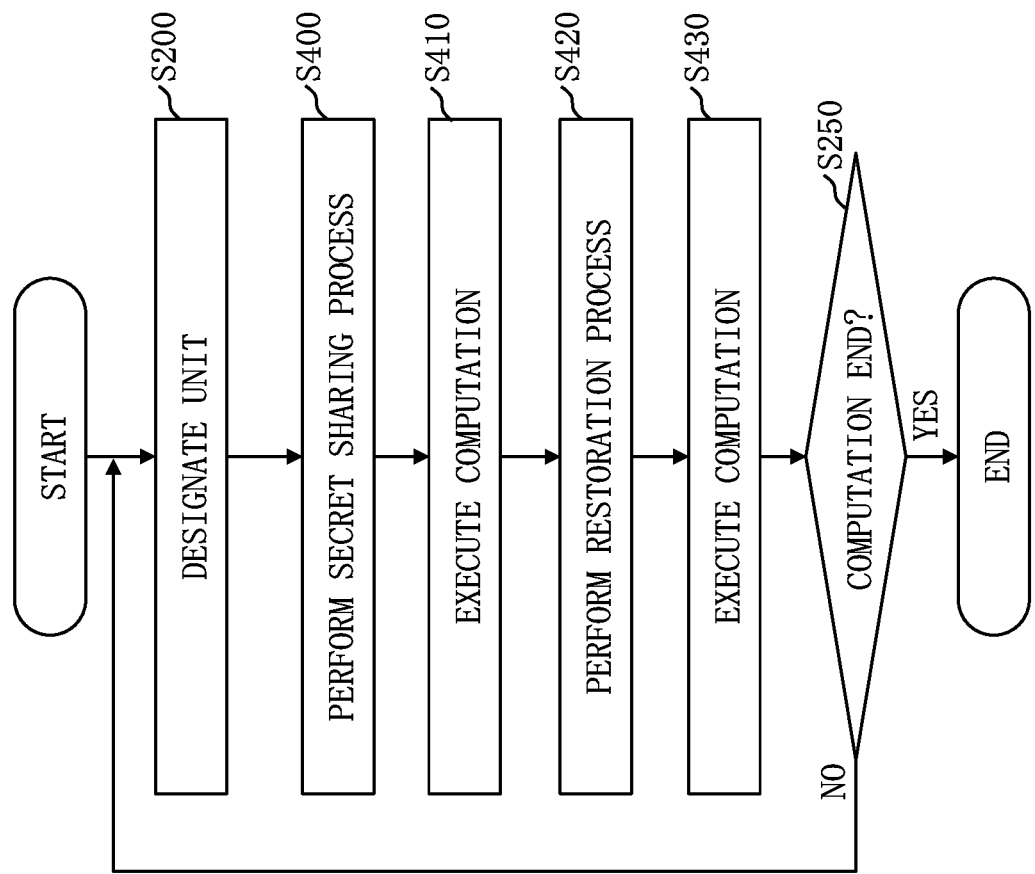
FIG. 12 is a flowchart illustrating a computation process of an information processing device according to Embodiment 3.

FIG. 12 is a flowchart illustrating a computation process example of an information processing device 1 according to the present embodiment. The same operation as in Embodiment 2 is denoted by the same reference sign as in Embodiment 2, and will not be described.

After step S200 is completed, in step S400, a computation procedure change unit 100 performs the secret sharing process on the basis of Shamir's secret sharing scheme.

Specifically, a computation execution unit 101 notifies the computation procedure change unit 100 of a plurality of input values and a plurality of weights inputted to a designated unit.

Upon reception of the notification from the computation execution unit 101, the computation procedure change unit 100 acquires a random number from a random number generator 15.

Using random numbers acquired from the random number generator 15, the computation procedure change unit 100 generates five shares from each of the plurality of input values notified of by the computation execution unit 101, and five shares from each of the plurality of weights notified of by the computation execution unit 101.

Then, the computation procedure change unit 100 notifies the computation execution unit 101 of the generated shares. Details of the secret sharing process will be described later.

Subsequently, in step S410, the computation execution unit 101 performs computation using the shares notified of by the computation procedure change unit 100. Details of the computation using the shares will be described later.

Then, the computation execution unit 101 notifies the computation procedure change unit 100 of a result of computation that uses the shares.

Subsequently, in step S420, using a result of computation that uses the shares notified of by the computation execution unit 101, the computation procedure change unit 100 performs a restoration process of restoring results of multiplication of the plurality of input values by the plurality of weights. Details of the restoration process will be described later.

A computation result obtained by this restoration process is the same as a computation result that uses the weights and the input values which are prior to the secret sharing process.

Then, the computation procedure change unit 100 notifies the computation execution unit 101 of the restored multiplication results.

Subsequently, in step S430, the computation execution unit 101 finds a total sum of the restored multiplication results notified of by the computation procedure change unit 100. After that, the computation execution unit 101 executes bias addition and computation of the activation function sequentially.

The computation procedure change unit 100 changes the computation procedure by: performing the secret sharing process on the input values inputted to the unit; causing the computation execution unit 101 to perform computation using the values having been subjected to the secret sharing process; performing a restoration process on a computation result of the computation execution unit 101; and causing the computation execution unit 101 to perform bias addition using the values having been subjected to the restoration process, and computation of the activation function. The computation result (computation result of the activation function) before changing the computation procedure is the same as the computation result (computation result of the activation function) after changing the computation procedure.

In this manner, the computation procedure change unit 100 changes the computation procedure while keeping the sameness of the computation results of the computations that use the activation function. Then, the computation execution unit 101 performs computation in accordance with the post-change computation procedure. Specifically, the computation execution unit 101 performs computation on the values having been subjected to the secret sharing process done by the computation procedure change unit 100, instead of performing computation on the input values inputted to the unit. Also, the computation execution unit 101 outputs a computation result of the restoration-processed values to the computation procedure change unit 100 and executes bias addition and computation of the activation function on the values that have been restoration-processed by the computation procedure change unit 100, instead of executing computation of the activation function on a computation result of the input values inputted to the unit.

The secret sharing process, computation using shares, and the restoration process will be described in detail with referring to FIG. 13.

Figure 13:
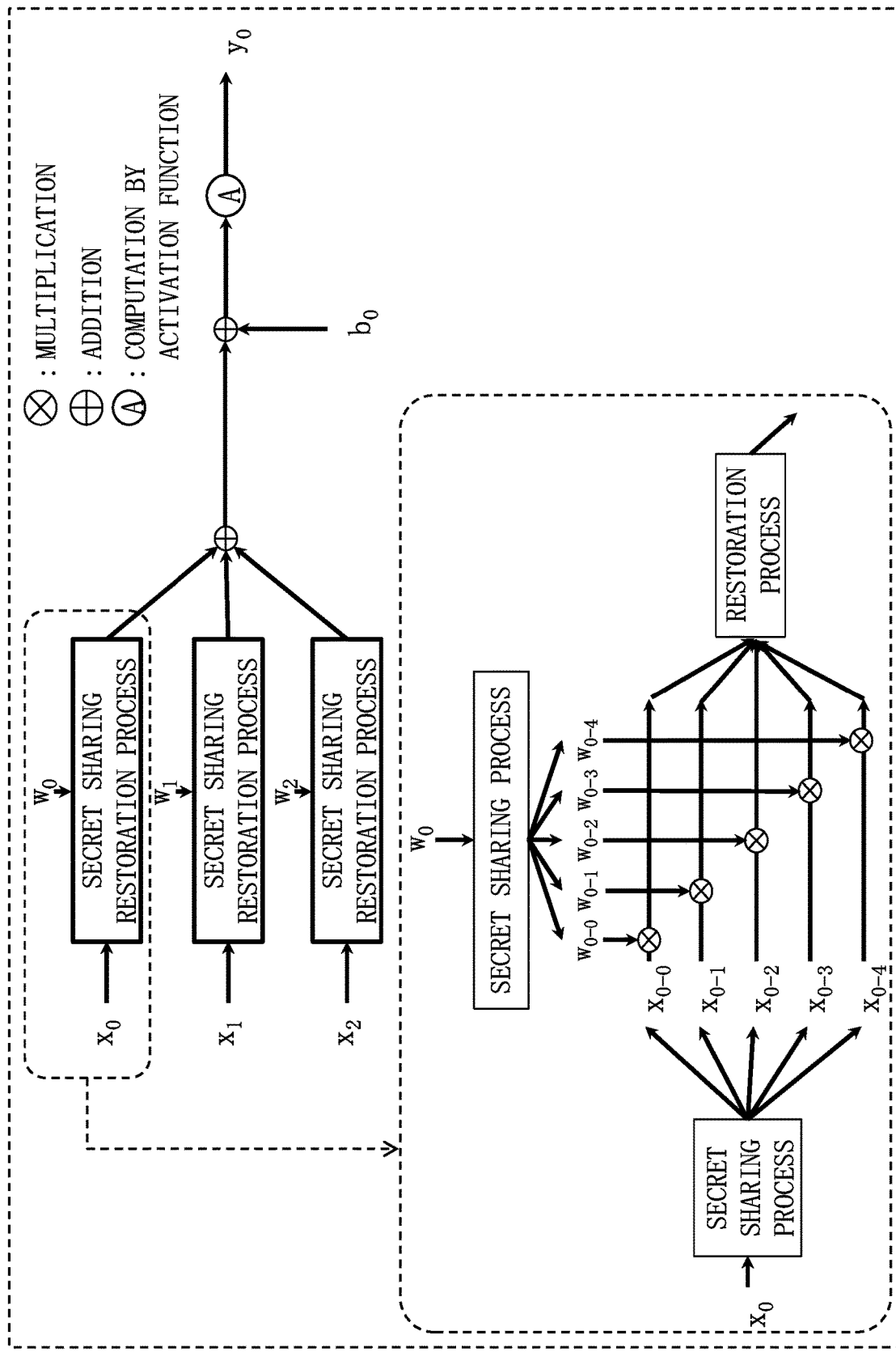
FIG. 13 is a diagram illustrating a change of a computation procedure according to Embodiment 3.

FIG. 13 illustrates a change example of the computation procedure according to the present embodiment.

FIG. 13 indicates that the secret sharing process and the restoration process are performed in each computation between the plurality of input values and the plurality of weights.

More specifically, FIG. 13 illustrates an example of the secret sharing process related to multiplication of an input value $x_0$ and a weight $w_0$, and an example of the restoration process related to multiplication of the input value $x_0$ and the weight $w_0$.

The computation procedure change unit 100 generates identifiers using the random number generated by the random number generator 15. Also, the computation procedure change unit 100 divides the input value and the weight each into shares with using the generated identifiers.

In FIG. 13, there are five identifies which are 0, 1, 2, 3, and 4.

The computation procedure change unit 100 indicates dividing an input value $x_0$ into five shares $x_{0\text{-}0}$, $x_{0\text{-}1}$, $x_{0\text{-}2}$, $x_{0\text{-}3}$, and $x_{0\text{-}4}$ corresponding to five identifiers.

The computation procedure change unit 100 also indicates dividing a weight $w_0$ into five shares $w_{0\text{-}0}$, $w_{0\text{-}1}$, $w_{0\text{-}2}$, $w_{0\text{-}3}$, and $w_{0\text{-}4}$ corresponding to the five identifiers.

As described above, the five identifiers use random numbers generated by the random number generator 15. Therefore, each time computation is to be executed, identifies and irregular values corresponding to the identifiers are obtained. In a specific example, the five identifies may be 1, 10, 5, 9, and 3. In that case, five shares, which correspond to the five identifiers, of the input value $x_0$ are $x_{0\text{-}1}$, $x_{0\text{-}10}$, $x_{0\text{-}5}$, $x_{0\text{-}9}$, and $x_{0\text{-}3}$. Also, five shares, which correspond to the five identifiers, of the weight $w_0$ are $w_{0\text{-}1}$, $w_{0\text{-}10}$, $w_{0\text{-}5}$, $w_{0\text{-}9}$, and $w_{0\text{-}3}$.

Subsequently, the computation execution unit 101 performs multiplication of the five generated shares of the input value and the five generated shares of the input weight, between two shares of the same subscript. Specifically, $x_{0\text{-}0}$ is multiplied by $w_{0\text{-}0}$. Also, $x_{0\text{-}1}$ is multiplied by $w_{0\text{-}1}$.

Individual products obtained by multiplication are used for the restoration process.

Subsequently, in the restoration process, the computation procedure change unit 100 restores the product of the input value $x_0$ and the weight $w_0$ on the basis of the five identifiers and the individual products.

In the present embodiments, five identifies are generated. However, a number of identifies is not limited to 5, but may be any value equal to or larger than 3.

As has been described above, in the present embodiment, a secret sharing process using a random number is added to the computation procedure which is set down by the learning model on the basis of the Shamir's secret sharing scheme. Hence, each time computation is to be executed, the computation procedure is changed irregularly. Accordingly, the side channel information generated when the computation is executed changes irregularly. Therefore, it is possible to prevent the leaning parameter being the learning model information from being analyzed.

The embodiments of the present disclosure have been described above. Of these embodiments, two or more may be practiced in combination.

Alternatively, of these embodiments, one may be practiced partly.

Alternatively, of these embodiments, two or more may be practiced partly in combination.

The present invention is not limited to these embodiments, but may be changed in various manners as necessary.

REFERENCE SIGNS LIST

1: information processing device; 10: processor; 11: memory; 12: auxiliary storage device; 13: input/output I/F; 14: communication device; 15: random number generator; 100: computation procedure change unit; 101: computation execution unit; 110: learning model; 200: storage unit; 210: model architecture; 220: learning parameter.

The invention claimed is:

1. An information processing device having:
processing circuitry
to change a computation procedure, each time a computation execution time arrives to execute computation that uses a learning parameter having a value to be adjusted by machine learning, irregularly to a computation procedure which is different from a pre-change computation procedure and with which a same computation result as a computation result obtained by executing computation in accordance with the pre-change computation procedure is obtained, and
to execute computation that uses the learning parameter, each time the computation execution time arrives, in accordance with the changed computation procedure,
wherein the processing circuitry changes a computation procedure that uses a value of the learning parameter and an operand value which is a value to be computed with the learning parameter, such that the value of the learning parameter and the operand value are concealed, and changes a computation order of the computation procedure by using a shuffle algorithm.

2. An information processing device having:
processing circuitry
to change a computation procedure, each time a computation execution time arrives to execute computation that uses a learning parameter having a value to be adjusted by machine learning, irregularly to a computation procedure which is different from a pre-change computation procedure and with which a same computation result as a computation result obtained by executing computation in accordance with the pre-change computation procedure is obtained, and
to execute computation that uses the learning parameter, each time the computation execution time arrives, in accordance with the changed computation procedure,
wherein the processing circuitry changes a value of the learning parameter and an operand value which is a value to be computed with the learning parameter, on a basis of Shamir's secret sharing scheme.

3. The information processing device according to claim 1,
wherein the processing circuitry changes the computation procedure by adding another value other than the value of the learning parameter and the operand value.

4. The information processing device according to claim 3,
wherein the processing circuitry changes the computation procedure by adding addition that uses said another value.

5. The information processing device according to claim 3,
wherein the processing circuitry changes the computation procedure by adding multiplication that uses said another value.

6. The information processing device according to claim 1,
wherein the processing circuitry changes the value of the learning parameter and the operand value on a basis of Shamir's secret sharing scheme.

7. The information processing device according to claim 1,
wherein the processing circuitry uses Fisher-Yates shuffle or Sattolo's algorithm, as the shuffle algorithm.

8. The information processing device according to claim 1,
wherein the processing circuitry changes the computation procedure with using a random number.

9. The information processing device according to claim 7,
wherein the processing circuitry changes the computation procedure with using a random number.

10. An information processing method comprising:
changing a computation procedure, each time a computation execution time arrives to execute computation using a learning parameter having a value to be adjusted by machine learning, irregularly to a computation procedure which is different from a pre-change computation procedure and with which a same computation result as a computation result obtained by executing computation in accordance with the pre-change computation procedure is obtained; and
executing computation that uses the learning parameter, each time the computation execution time arrives, in accordance with the computation procedure that has been changed,
wherein, when changing to the computation procedure which is different from the pre-change computation procedure, a computation procedure that uses a value of the learning parameter and an operand value which is a value to be computed with the learning parameter is changed, such that the value of the learning parameter and the operand value are concealed, and a computation order of the computation procedure is changed by using a shuffle algorithm.

11. A non-transitory computer-readable recording medium recorded with an information processing program which causes a computer to execute:
- a computation procedure change process of changing a computation procedure, each time a computation execution time arrives to execute computation that uses a learning parameter having a value to be adjusted by machine learning, irregularly to a computation procedure which is different from a pre-change computation procedure and with which a same computation result as a computation result obtained by executing computation in accordance with the pre-change computation procedure is obtained; and
- a computation execution process of executing computation that uses the learning parameter, each time the computation execution time arrives, in accordance with the computation procedure that has been changed by the computation procedure change process,
- wherein the computation procedure change process includes changing a computation procedure that uses a value of the learning parameter and an operand value which is a value to be computed with the learning parameter, such that the value of the learning parameter and the operand value are concealed, and changing a computation order of the computation procedure by using a shuffle algorithm.

12. An information processing method comprising:
- changing a computation procedure, each time a computation execution time arrives to execute computation using a learning parameter having a value to be adjusted by machine learning, irregularly to a computation procedure which is different from a pre-change computation procedure and with which a same computation result as a computation result obtained by executing computation in accordance with the pre-change computation procedure is obtained; and
- executing computation that uses the learning parameter, each time the computation execution time arrives, in accordance with the computation procedure that has been changed,
- wherein, when changing to the computation procedure which is different from the pre-change computation procedure, a value of the learning parameter and an operand value which is a value to be computed with the learning parameter are changed, on a basis of Shamir's secret sharing scheme.

13. A non-transitory computer-readable recording medium recorded with an information processing program which causes a computer to execute:
- a computation procedure change process of changing a computation procedure, each time a computation execution time arrives to execute computation that uses a learning parameter having a value to be adjusted by machine learning, irregularly to a computation procedure which is different from a pre-change computation procedure and with which a same computation result as a computation result obtained by executing computation in accordance with the pre-change computation procedure is obtained; and
- a computation execution process of executing computation that uses the learning parameter, each time the computation execution time arrives, in accordance with the computation procedure that has been changed by the computation procedure change process,
- wherein the computation procedure change process includes changing a value of the learning parameter and an operand value which is a value to be computed with the learning parameter, on a basis of Shamir's secret sharing scheme.

* * * * *